United States Patent Office 3,494,979
Patented Feb. 10, 1970

3,494,979
THERMOSETTING STYRENE-MALEIMIDE CO-
POLYMERS HAVING N-2,3-EPOXYPROPYL
OR N-AMINOETHYL GROUPS, THEIR PREP-
ARATION AND COATING COMPOSITIONS
CONTAINING SAME
Richard J. Pratt, Flossmoor, Ill., assignor to Sinclair
Research, Inc., New York, N.Y., a corporation of
Delaware
No Drawing. Filed Nov. 9, 1967, Ser. No. 681,924
Int. Cl. C08g 30/08, 20/32
U.S. Cl. 260—836
13 Claims

ABSTRACT OF THE DISCLOSURE

Thermosetting polyimides of low molecular weight styrene-maleic anhydride copolymers wherein the imide nitrogen is directly attached to a free glycidyl group or a free aminoethyl group are prepared respectively by reacting, preferably in a solvent, an alkali metal salt of the polyimide with epichlorohydrin and by reacting, preferably in a solvent, the polyimide with ethylenimine. These glycidyl and aminoethyl polyimides are soluble in inert organic solvents and are stable in solid form and in organic solution at ambient temperatures. Thermosetting coating compositions are obtained with the glycidyl polyimides by the addition of an amine curing agent and with the aminoethyl polyimides by the addition of an epoxy curing agent. These coating compositions in an inert organic solvent have good pot life and require only short cure schedules at elevated temperatures. The resultant coatings are very solvent resistant and are suitable for coating uses on electrical elements and apparatus.

This invention relates to thermosetting copolymers, to their preparation and to thermosetting coating compositions containing these copolymers. More particularly, this invention relates to thermosetting polyimides of low molecular weight styrene-maleic anhydride copolymers which are soluble in inert organic solvents, to methods for their preparation and to thermosetting coating compositions comprising these polyimides and a curing agent.

Aminoethylimides can be prepared by reacting excess ethylenediamine with simple anhydrides, such as succinic anhydride. However, when this procedure is used with styrene-maleic anhydride copolymers, irreversible and insoluble gels result. Any polyanhydride would be susceptible to gellation since both ends of ethylenediamine are of equal reactivity.

N-epoxyalkylimides of simple anhydrides can be prepared by reacting an N-alkenylimide of the simple anhydride with peracetic acid. In this manner N-[1-methylglycidyl]maleimide has been obtained from N-methallylmaleimide and homopolymerized. At room temperature polymerization with boron trifluoride-diethyl ether complex gave a soluble homopolymer. However polymerization with dibenzoyl peroxide at steam bath temperature gave an insoluble polymer. It is well known that glycidyl imides are sensitive to heat and/or catalysts, polymerizing rapidly to infusible and insoluble products. Such insoluble products are not suitable for coating compositions. However no soluble thermosetting low molecular weight copolymers of styrene and glycidyl or aminoethyl substituted imides of maleic anhydride have heretofore been prepared.

It has now been found in accordance with the present invention that thermosetting polyimides of low molecular weight styrene-maleic anhydride copolymers can be prepared wherein the imide nitrogen is directly attached to a reactive glycidyl group i.e. 2,3-epoxypropyl groups, or a reactive aminoethyl group and which are soluble in inert organic solvents. By reactive glycidyl group and reactive aminoethyl group is meant respectively that the glycidyl group is pendant to imide nitrogen and contains its reactive epoxy structure and that the aminoethyl group is pendant to imide nitrogen and contains its reactive amino structure, that is these reactive groups are free and intact and have not been broken by cross-linkage.

The soluble thermosetting N-glycidyl polyimides of low molecular weight styrene-maleic anhydride copolymers of this invention are prepared by reacting epichlorohydrin, preferably in a solvent, with an alkali metal salt, preferably the potassium salt of the polyimide of the styrene-maleic anhydride copolymer. The soluble, thermosetting N-aminoethyl polyimides of low molecular weight styrene-maleic anhydride copolymers of this invention are prepared by reacting ethylenimine, preferably in a solvent, with the polyimide of the styrene-maleic anhydride copolymer. Although it is possible to react ethylenimine without an inert organic solvent, the reaction of epichlorohydrin with the potassium imide is hard to control without an inert organic solvent. One experiment using a large excess of epichlorohydrin afforded an infusible gel in the absence of solvent due to lack of heat control; thus an inert organic solvent is preferred as a practical way to take heat from the reaction and control the temperature. Dimethyl formamide and dimethyl sulfoxide are preferred inert organic solvents. Since the products are soluble in chloroform and in tetrahydrofuran, these can be used in place of part or all of the dimethylformamide or dimethylsulfoxide.

The preferred reaction conditions for preparing the glycidyl polyimide are to react as excess of epichlorohydrin with the potassium salt of the styrene-maleimide copolymer in solution in dimethylsulfoxide solvent at about room temperature (20–25° C.). However, temperatures from about 20–25° C. up to just below the decomposition temperature of the glycidyl polyimide, and preferably up to about 100° C., can be used, if desired.

In the present invention the preparation of the glycidyl polyimide of styrene-maleic anhydride copolymer does not require heating as the reaction can be carried out at room temperature. Glycidyl imides are sensitive to heat and on undue heating can decompose or polymerize to infusible and insoluble products.

The preferred reaction conditions for preparing the aminoethyl polyimide are to react an excess of ethylenimine (1.5 moles) with the unsubstituted styrene-maleimide copolymer (1.0 mole) in 75% of solution weight as chloroform (solvent) at about 60–70° C. reaction temperature for about 16 hours reaction time. However, temperatures of about 50° C. up to temperatures just below that which would open the imide ring, and preferably up to about 100° C., can be used, if desired.

The polyimides have repeating units derived from styrene and maleimide and contain at least an average of about 1.5 glycidyl or aminoethyl groups per molecule and often up to about 5 and even up to about 10 or more per molecule. While some cross-linkage may occur there is essentially no cross-linkage sufficient to cause insolubility of these polyimides in an inert organic solvent, such as methylethylketone.

The glycidyl polyimides of styrene-maleic anhydride copolymers containing the epoxy structure can be cured with amine curing agents and the aminoethyl polyimides of styrene-maleic anhydride copolymers containing the amino structure can be cured with epoxy resins or glycidyl compounds. Thus soluble thermosetting coating compositions are obtained by mixing the glycidyl polyimides and the aminoethyl polyimides with their respective curing agents, generally in about .5 to 1.5 mole equivalents of curing agent and preferably in about stoichiometric proportions. These compositions are soluble in inert organic solvents, such as methylethyl ketone, Cellosolve, Carbitol and the like and in these solvents with some xylene, butanol, butyl acetate and the like.

The glycidyl and aminoethyl polyimides can be readily cured by heating these coating compositions for a few minutes at elevated temperatures. The coating compositions of this invention can be cured, for instance, at about 125–200° C. for 5 minutes to one hour. The reactivity of the glycidyl and aminoethyl polyimides of this invention is so great that usually only a few minutes at elevated temperature gives a satisfactory cure. Still, the pot life is exceptional. In contrast, epoxy resins are cured by amines, such as ethylenediamine in 15–30 minutes in a solvent at room temperature. This cure is not complete but it illustrates the very shortworking pot life encountered with other epoxide resins.

Amine curing agents are well known in the art of curing epoxies. Examples are ethylenediamine, and polyethyleneamine diamines of the formula

where $n=2, 3, 4$, etc., such as diethylenetriamine; phenylene-diamine; alkanolamines of the formula

where $n=1, 2, 3$, and 4 such as ethanolamine; and piperazine. Polyamines are the preferred curing agent for the glycidyl polyimides of this invention.

Theoretically, every N—H is a potentially reactive site. Therefore, the least quantity capable of using all the epoxy groups would be equal to the molecular weight of amine divided by the number of N—H groups. In this way the degree of cross-link and properties can be controlled by varying the caring reactant, quantities, temperature and time. Diluents affecting the viscosity, fire retardance and other properties can be included providing the approximate stoichiometric balances are maintained.

In addition to the glycidyl compounds, such as the glycidyl ether of bisphenol A (condensation product of epichlorohydrin and bisphenol A), examples of other epoxy resin curing agents having more than one epoxy group per molecule for curing the aminoethyl polyimides are epoxy resins derived from allyl ethers of phenol formaldehyde resins, and epoxidized butadiene polymers.

Styrene and maleic anhydride can be polymerized to form polymers for use in this invention by conventional polymerization methods. Solution polymerization methods can be employed where the monomers are polymerized in a suitable solvent using as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The polymer contains a molar ratio of styrene to maleic anhydride of about 1:1 to 4:1 and has an average molecular weight of about 500 to 5000 and preferably within the range of about 500 to 2500.

The polyimide of styrene-maleic anhydride copolymers can be prepared for use in this invention by conventional imide-forming methods. For example the styrene-maleic anhydride copolymer can be reacted with ammonia and then the ammoniated copolymer can be heated to 180° C. for six hours to form the polyimide.

Polymers suitable for use in this invention can be prepared from maleimide and from maleimides where one of the hydrogens attached to double bonded carbon is replaced by methyl, phenyl, branched aliphatic, saturated cyclic, fused rings, and heterocyclic groups. The maleimide may then be copolymerized by conventional techniques or by high energy radiation with styrene or with other polymerizable olefins such as ethylene, isobutylene, cyclopentadiene, butadiene or with polymerizable monomers non-reactive to ethylenimine or epichlorohydrin. This latter category includes acrylic esters, amides, and nitriles. The ratio of monomers can be varied as desired. Copolymers of other polymerizable anhydrides, such as itaconic anhydride and its derivatives may also be used.

It is preferred that the imide starting material be at least 80–90% imide on the basis of total starting anhydride. However, the polyimide may contain a minor amount of non-imide groups.

Hydrolysis conditions should be also avoided to prevent the production of by-products such as anhydride or carboxylic acid. These by-products may be detrimental in that they react with amino and epoxy groups, thus leading to more difficult to control thermosetting behavior of the products. For this reason water and even alcohols should be avoided during the reactions. However, the precipitation of product from dimethyl sulfoxide and dimethyl formamide by dilution with water during the isolation step is permitted since precipitated material hydrolyzes very slowly.

It is possible by limiting the epichlorohydrin or ethylenimine reactant that some unreacted imide may remain in the product. Unreacted imide can be tolerated and can provide other functionality if needed. The polyimide of styrenemaleic anhydride copolymer does not react with bisphenol based epoxies at even elevated temperatures.

Epichlorohydrin is a derivative of glycidol. Epibromohydrin could be used but because its cost and equivalent weight are higher, the more readily available chloro-derivative, epichlorohydrin, is preferred. Substitution at the three carbon atom can be used to afford mixed functionality as in introducing nitrile, or ester. Substitution with methyl, ethyl or vinyl and other small groups which do not affect the displacement reaction mechanism may also be used.

In addition to ethylenimine, other aziridines, including propylenimine and N-methyl-ethylenimine which are commercially available, are suitable for use in this invention.

This invention discloses a new way of introducing an epoxy or amine group onto a polymer chain. The glycidyl and aminoethyl polyimides of styrene-maleic anhydride are stable in solid form and in solution at ambient temperatures.

Coatings are prepared from very stable solutions of these glycidyl and aminoethyl polyimides with a curing agent after only short cure schedules at elevated temperatures. These coating compositions in solution, containing a curing agent, have good pot life. The resulting coatings are very solvent resistant.

The cyclic imide grouping imparts thermal stability to these coatings and they can be used on electrical elements and apparatus and in space environment uses, for corrosion resistance, radiation protection and as coatings resistant to decomposition from dielectric heating. In addition, the glycidyl and aminoethyl polyimides of styrene-maleic anhydride copolymers can be used in laminates, dielectrics, castings and related uses.

The following examples further illustrate various embodiments of this invention.

The styrene to maleic anhydride ratio in the copolymers used in the examples is 1:1 and the molecular weight is about 600–800. The acid number of the copolymer is about 450 which corresponds to a repeating unit weight of about 245–250, or about three repeating units per molecule.

EXAMPLE A

The polyimide of the styrene-maleic anhydride copolymer is prepared in a conventional manner by heating to 180° C. for six hours an ammoniated sample of the above styrene-maleic anhydride copolymer. The preparation of the polyimide by reacting styrene-maleic anhydride polymer with ammonia is well known in the art. In this manner a polyimide of the styrene-maleic anhydride copolymer is obtained containing 5.1% N (theory for this sample is 5.7% N).

EXAMPLE I

Preparation of N-[1-(beta-aminoethyl)]imide of styrene-maleic anhydride copolymer A mixture of 24.5 g. of the polyimide of the styrene-maleic anhydride copolymer of Example A and 6.4 g. of ethylenimine in 50 ml. of chloroform is heated under reflux for 16 hours, concentrated under vacuo and dried in a vacuum oven. The product analyzed 9.6% Kjeldahl N (theory 9.7%), titrated for 4.3% basic N (theory 4.8%). By acetylation in pyridine an equivalent weight of 301 (theory 291) per amine group was found.

A shorter reaction time gives lower yields.

The infra-red spectra reveals bands at $5.6\mu$ which is indicative of cyclic imide carbonyl absorption. The aminoethylimide of the styrene-maleic anhydride copolymer exhibits additional bands at $3.0\mu$ ($-NH_2$) and at $8.65\mu$ ($C-NH_2$).

EXAMPLE II

Preparation of N-[1-glycidyl]imide of styrene-maleic anhydride copolymer

A solution of 1.1 g. of potassium hydroxide in 20 ml. of dry methanol is aded to a solution of 5.0 g. of the polyimide of the styrene-maleic anhydride copolymer of Example A in 20 ml. of ethylene glycol dimethylether. The yellow solid obtained by concentrating in vacuo on a hot water bath is the potassium salt of the polyimide of the styrene-maleic anhydride copolymer and is mixed with 10.0 ml. of dimethyl sulfoxide and 6.0 ml. of redistilled epichlorohydrin. Upon stirring, the mixture becomes homogeneous and assumes a wine-red color. After 16 hours at room temperature (20–25° C.), the product is precipitated with water, neutralized, filtered and vacuum oven (50° C.) dried. The pink solid analyzes by hydrogen chloride in ether for 4.0% oxirane oxygen (theory 5.3%). The solid decomposes on heating. It is soluble in chloroform, acetonitrile, tetrahydrofuran and methylethylketone.

Another reaction run in dimethyl formamide for 20 min. at 70–80° C. gives a similar product of slightly lower oxirane content (3.5%). Longer reaction periods give still lower results.

Infra-red spectra revealed bands at $5.6\mu$ for the products which is indicative of cyclic imide carbonyl absorption. The glycidyl polyimide of the styrene-maleic anhydride copolymer exhibited epoxy bands at $7.94\mu$ (ether) and $11.8\mu$.

The following examples illustrate various coating compositions of this invention and the results obtained on coatings prepared from very stable solutions after only short cure schedules at elevated temperatures. Coatings of 1 mil thickness were made on tin plate for testing.

EXAMPLE III

Formulation of self-curing thermosetting surface coating 3.05 g. N-[1-glycidyl]polyimide of styrene-maleic anhydride copolymer (1:1 molar ratio of styrene to maleic anhydride and 950 mol. wt.) and 0.35 g. ethylenediamine are dissolved in 20.0 g. methylethylketone. The pot life was 1 week before gelation. Coatings were prepared from this coating composition, cured and tested with the following results.

After curing for 30 min. at 150° C.

Mandrel bend—pass ¼″
Pencil hardness—2H

After curing for 15 min. at 150° C.

3 hr. xylene and acetone immersion—No effect.

EXAMPLE IV

Formulation of an epoxy resin thermosetting surface coating 1.45 g. N-[1-(beta-aminoethyl)]polyimide of styrene-maleic anhydride copolymer and 5.00 g. "Epon 1001" Shell's glycidyl ether of bisphenol-A (500 equiv. wt. per epoxy) are dissolved in 13.0 g. methylethylketone. The pot life was 5–6 weeks. Coatings were prepared from this coating composition, cured for 30 min. at 150° C., and tested with the following results.

Mandrel bend—Pass ⅛
Pencil hardness—2H
3 hr. xylene and acetone immersion—No effect.

EXAMPLE V

Formulation of an epoxy resin thermosetting surface coating 2.0 g. N-[1-(beta-aminoethyl)]polyimide of styrene-maleic anhydride copolymer and 2.32 g. "Epon 828" Shell's condensation product of epichlorohydrin and bisphenol-A (190 equiv. wt. per epoxy) were dissolved in 4.0 g. methylethylketone. Coatings were prepared from this coating composition, cured, for various times as specified, and tested with the following results.

1 min. at 155° C.—gel.
5 min. at 155° C.:
  Mandrel bend—Passes ¼
  Pencil hardness—Passes HB
20 min. at 155° C.:
  Pencil hardness—Passes F
  Xylene and acetone resistance (50 rubs)—No effect.
50 min. at 155° C.:
  No change
  Xylene and acetone resistance (50 wet rubs)—No effect.

It is claimed:

1. A thermosetting polyimide of low molecular weight styrene-maleic anhydride copolymer having repeating units derived from styrene and maleimide wherein the styrene-maleimide copolymer is substituted on imide nitrogen atoms by pendant groups consisting essentially of aminoethyl groups or 2,3-epoxypropyl groups, said copolymer containing a molar ratio of styrene to maleic anhydride of about 1:1 to 4:1 and having an average molecular weight within the range of about 500 to 5000.

2. A thermosetting polyimide as set forth in claim 1 wherein the styrene-maleimide copolymer is substituted on imide nitrogen atoms by pendant groups consisting essentially of 2,3-epoxypropyl groups.

3. A thermosetting polyimide as set forth in claim 1 wherein the styrene-maleimide copolymer is substituted on imide nitrogen atoms by pendant groups consisting essentially of aminoethyl groups.

4. A thermosetting coating composition which comprises, in an inert organic solvent, a soluble styrene-maleimide copolymer as set forth in claim 1 wherein the styrene-maleimide copolymer is substituted on imide nitrogen atoms by pendant groups consisting essentially of 2,3-epoxypropyl groups, and an amine curing agent which is present in proportions of 0.5 to 1.5 mole equivalents per mole of epoxy group.

5. A thermosetting coating composition as set forth in claim 4 wherein said amine curing agent is ethylenediamine.

6. A thermosetting coating composition which comprises, in an inert organic solvent, a soluble styrene-maleimide copolymer as set forth in claim 1 wherein the styrene-maleimide copolymer is substituted on imide nitrogen atoms by pendant groups consisting essentially of aminoethyl groups, and an epoxy resin curing agent having more than one epoxy group per molecule which is present in proportion of 0.5 to 1.5 mole equivalents per mole of amino group.

7. A thermosetting coating composition as set forth in claim 6 wherein said epoxy resin curing agent is a glycidyl ether of bisphenol-A.

8. A thermosetting coating composition as set forth in claim 6 wherein said epoxy resin curing is a condensation product of epichlorohydrin and bisphenol-A, and said copolymer contains a molar ratio of styrene to maleic anhydride of about 1:1 and has an average molecular weight of about 500 to 2500.

9. Process for preparing thermosetting polyimides of claim 1 which comprises reacting epichlorohydrin with an alkali metal salt of a low molecular weight styrene-maleimide copolymer having a molar ratio of styrene to maleic anhydride of about 1:1 to 4:1 and having an average molecular weight of about 500 to 5000 and obtaining, as the resulting product, the 2,3-epoxypropyl derivative of the styrene-maleimide copolymer wherein imide nitrogen atoms are substituted by pendant groups consisting essentially of 2,3-epoxypropyl groups.

10. Process for preparing thermosetting polyimides as set forth in claim 9 wherein said alkali metal salt of the styrene-maleimide copolymer is the potassium salt of the styrene-maleimide copolymer.

11. Process for preparing thermosetting polyimides of claim 9 wherein epichlorohydrin is reacted with the alkali metal salt of said styrene-maleimide copolymer in an inert organic solvent at a temperature within the range of about 20–25° C. to about 100° C.

12. Process for preparing thermosetting polyimides of claim 1 which comprises reacting ethylenimine with a low molecular weight styrene-maleimide copolymer having a molar ratio of styrene to maleic anhydride of about 1:1 to 4:1 and having an average molecular weight of about 500 to 5000 and obtaining, as the resulting product, the aminoethyl derivative of the styrene-maleimide copolymer wherein imide nitrogen atoms are substituted by pendant groups consisting essentially of aminoethyl groups.

13. Process for preparing a thermosetting polyimide of claim 12 wherein ethylenimine is reacted with said styrene-maleimide copolymer in an inert organic solvent at a temperature within the range of about 50 to about 100° C.

References Cited

UNITED STATES PATENTS

| 3,291,679 | 12/1966 | O'Brien | 260—78 |
| 3,386,959 | 6/1968 | Van Eygen | 260—78 |
| 3,429,947 | 2/1969 | Van Eygen | 260—78 |

MURRAY TILLMAN, Primary Examiner

PAUL LIEBERMAN, Assistant Examiner

U.S. Cl. X.R.

260—78,837, 78.5, 32.8, 33.6